United States Patent [19]
Dückinghaus et al.

[11] Patent Number: 6,047,628
[45] Date of Patent: Apr. 11, 2000

[54] CONTROL DEVICE FOR A STEERING SYSTEM

[75] Inventors: Heinz Dückinghaus, Bielefeld; Günter Eis, Harsewinkel; Norbert Strieker, Gütersloh, all of Germany

[73] Assignee: Claas Selbstfahrende Erntemaschinen GmbH, Harsewinkel, Germany

[21] Appl. No.: 09/139,827

[22] Filed: Aug. 25, 1998

[30] Foreign Application Priority Data

Aug. 26, 1997 [DE] Germany .............. 197 37 005

[51] Int. Cl.⁷ ............ F15B 13/044; F15B 13/04
[52] U.S. Cl. ............... 91/459; 91/465; 91/466; 91/469
[58] Field of Search ............ 91/459, 462, 464, 91/465, 466, 469

[56] References Cited

U.S. PATENT DOCUMENTS

| | | | |
|---|---|---|---|
| 4,085,657 | 4/1978 | Kervagoret | 91/465 X |
| 4,227,481 | 10/1980 | Cox et al. | 91/466 X |
| 4,616,674 | 10/1986 | Bardoll | 91/465 X |
| 4,623,031 | 11/1986 | Drutchas et al. | 91/465 X |
| 5,615,594 | 4/1997 | Duckinghaus | |

FOREIGN PATENT DOCUMENTS

| | | |
|---|---|---|
| 29 00 510 A1 | 7/1980 | Germany . |
| 29 35 065 A1 | 3/1981 | Germany . |
| 33 47 000 A1 | 7/1985 | Germany . |
| 36 21 864 A1 | 1/1988 | Germany . |
| 195 39 088 A1 | 4/1997 | Germany . |
| 196 03 270 C1 | 10/1997 | Germany . |

OTHER PUBLICATIONS

Improved Active and Passive Safety by Using Active Lateral Dynamic Control and an Unconventional Steering Unit, by Per Bränneby, Bo Palmgren, Anders Isaksson, Torbjörn Pettersson and Stig Franzë at the 13$^{th}$ International Technical Conference on Experimental Safety Vehicles, Nov. 7, 1991.

U.S. application No. 08/740,316, Diekhans, filed Oct. 28,1996.

*Primary Examiner*—Hoang Nguyen
*Attorney, Agent, or Firm*—Husch & Eppenberger, LLC; Robert E. Muir

[57] ABSTRACT

The present invention relates generally to agricultural machinery and, more particularly, to a device for controlling a double-acting steering cylinder of a steering system, having two working connections of the steering cylinder, wherein the working connections are each connected by means of an input pipe or an output pipe to a valve unit, which comprises two switching valves that can be moved alternately into a first switching position and into a second switching position and the steering cylinder in the first switching position of the first switching valve admits a fluid at the first working connection and the steering cylinder in the second switching position of the second switching valve admits the fluid at the second working connection.

11 Claims, 2 Drawing Sheets

CONTROL DEVICE FOR A STEERING SYSTEM

BACKGROUND OF THE INVENTION

The present invention relates generally to agricultural machinery and, more particularly, to improvements to steering systems of operator-driven agricultural machines. The invention concerns a device for controlling a double-acting steering cylinder of a steering system with two working connections which are each connected to a valve unit.

A device for controlling a double-acting steering cylinder of machine steering systems, known from German Patent 195 39 088 A1, has a valve unit which comprises two proportional valves. With proportional driving of the valves, relatively accurate displacement of a piston in the steering cylinder can be accomplished. Disadvantages of that device is that it is relatively slow, and driving the proportional valves requires relatively elaborate measures.

It is therefore the object of the present invention to overcome one or more of the deficiencies described above.

It is another object to provide a device for controlling a double-acting steering cylinder which has a simple construction and with which a rapid reversal of the direction of steering in the steering cylinder can be obtained.

SUMMARY OF THE INVENTION

In accordance with the present invention there is provided a control device for a double-acting steering cylinder of a steering system having two working connections of the steering cylinder which are connected to a valve unit. The valve unit comprises two switching valves which can be moved alternately in each case into a first switching position and into a second switching position.

The steering cylinder, in the first switching position of the first switching valve, admits a fluid at the first working connection and, in the second switching position of the second switching valve, admits the fluid at the second working connection.

The particular advantage of the embodiment is that the valve unit allows faster switching of the steering cylinder. Because the switching valves can each occupy only two predefined switching positions, a rapid reversal of direction of the piston in the steering cylinder can be obtained by combining the two switching valves. Furthermore, the switching construction for driving the switching valves is reduced because each switching valve can only be moved into two switching positions.

According to a particular embodiment of the invention, the switching valves each consist of a 3/2-port directional control valve and are integrated in a valve unit. The 3/2-port directional control valves are advantageously of identical construction. The switching valves are operated electromagnetically and independently of each other. An electromagnet is acted upon by an electrical control signal. The electromagnet comprises a preexcitation means by which the switching valve in the second switching position just blocks the pressure connection thereof. In this position the electromagnet acts upon the switching valve without opening it. Only a small increase in force of the electromagnet is required to transfer the switching valve to its first switching position. As a result, rapid switching of the switching valve from the second to the first switching position and vice versa is made possible.

According to another embodiment of the invention, the switching valves are each constructed as slide seat valves. In the second switching position of the switching valve is a spring-loaded ball arranged in a valve seat. The valve can be rapidly moved into a first switching position, opening the pressure connection, via displacement of the ball by means of a valve tappet. The ball seat advantageously protects the storage means from leaking oil.

Advantageously, the valve tappet is connected in one piece with a slide which is arranged on the circumferential side of the valve tappet in such a way that, upon operation of the switching valve, the input and output pipes of the switching valve are blocked for a short time.

BRIEF DESCRIPTION OF THE DRAWINGS

Preferred arrangements of the invention are described in more detail below with reference to the drawings, wherein.

DETAILED DESCRIPTION

A device embodying the invention is used for automatic steering of an agricultural machine, such as a combine, a harvester or a chopper. In this case a steering cylinder of a steering system operates as a function of a predetermined nominal value in such a way that, even when disturbances occur, the position of the piston in the steering cylinder allows the machine to maintain the desired direction of travel. The valves described below are controlled by means of a regulating device. The regulating device generates a control signal that is a function of the predetermined nominal position, the actual position of the machine and, under some circumstances, disturbance variables acting on the system.

Figure 1:
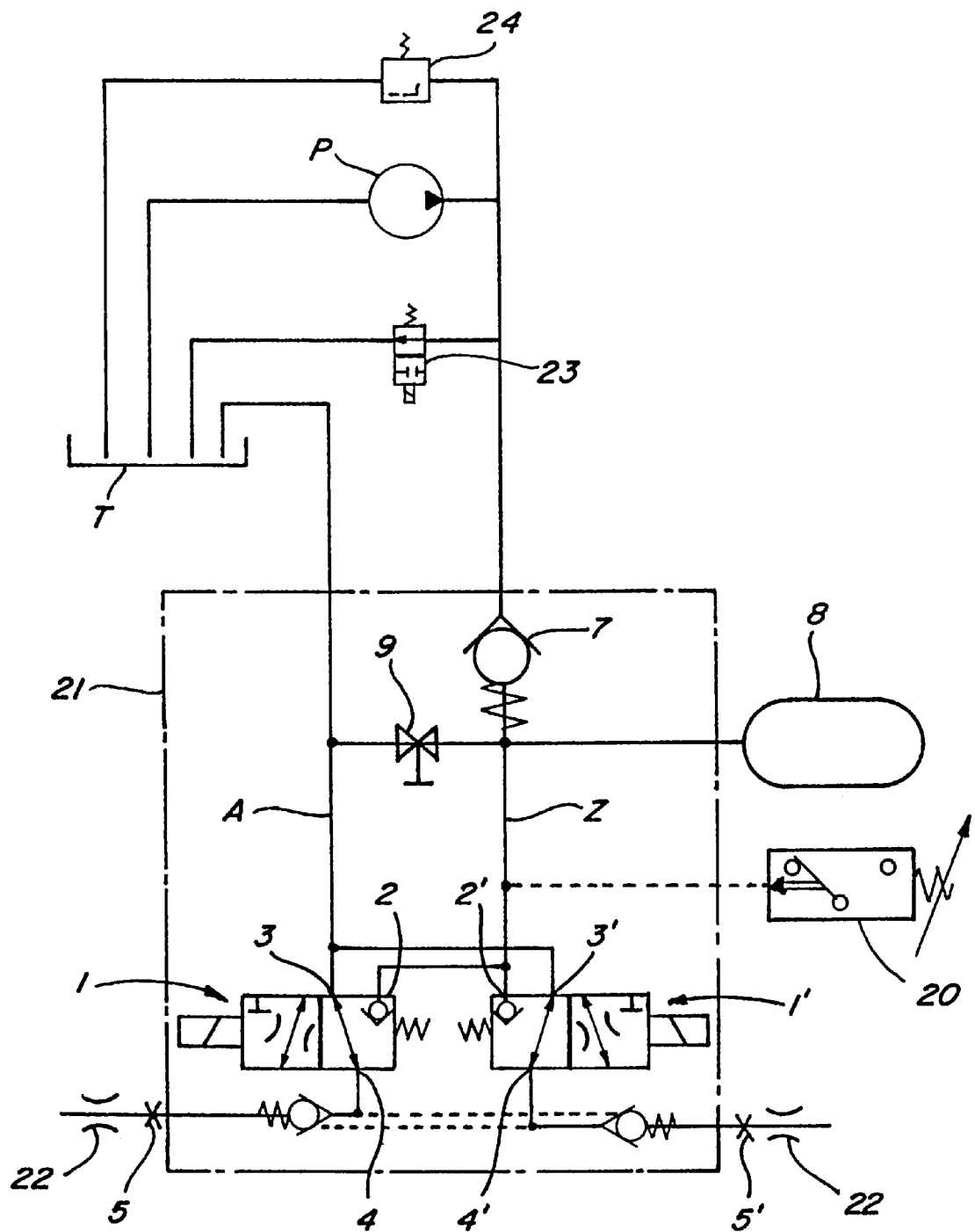
FIG. 1 is a block diagram of a device embodying the invention.

FIG. 1 shows a block diagram of the device including two switching valves 1 and 1' which can be driven independently of one another. The switching valves 1, 1' are each advantageously constructed as 3/2-port directional control valves which can be electromagnetically operated by a control signal. A control unit, not shown, delivers the control signals in such a way that the switching valves 1, 1' can each be moved into a first switching position or into a second switching position.

In the position shown in FIG. 1, the switching valves 1, 1' are both in the second switching position where pressure connections 2, 2' of the switching valves 1, 1' are blocked. Return connections 3, 3' of the switching valves 1, 1' are connected to a tank T by an output pipe or conduit A. Working connections 4 and 4' of the switching valves 1, 1' are connected, respectively, to a first working connection 5 or a second working connection 5' of a steering cylinder 6.

The pressure connections 2, 2' of the switching valves 1, 1' are each connected by a common supply pipe or conduit Z and a check valve 7 to a pump P. The pressure connections 2, 2' are also connected by the common supply pipe Z to a storage means, conveniently an accumulator 8. A maintenance valve 9 is arranged between the input pipe Z and the output pipe A. The maintenance valve 9, upon operation of the steering, is maintained in a blocking position and is opened only for maintenance purposes, so that the storage means 8 can be emptied.

Figure 2:
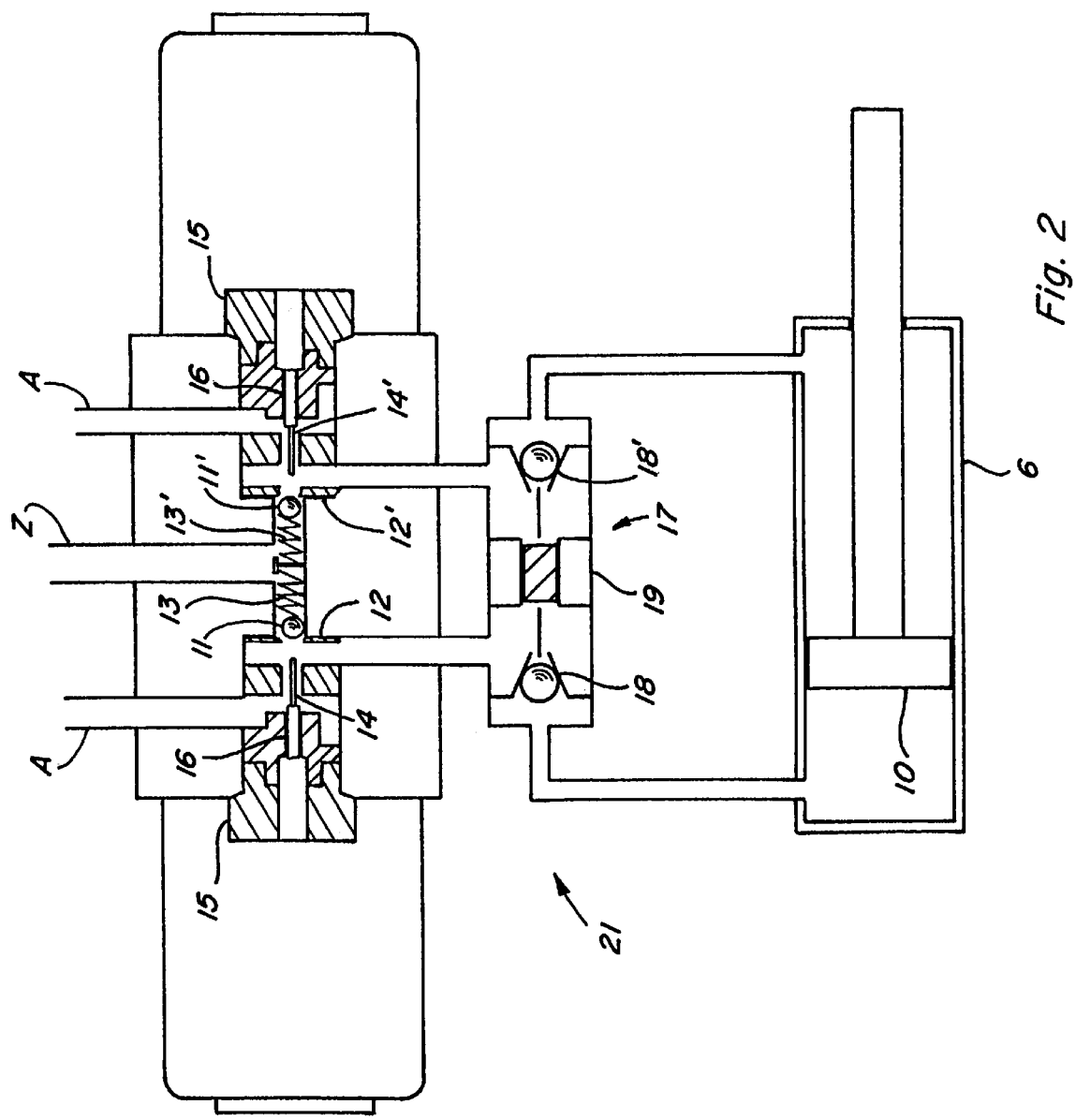
FIG. 2 is a schematic of the construction of a valve unit.

Referring to FIG. 2, a piston 10 of the steering cylinder 6 may be moved a certain distance in a predetermined direction. For example, when the switching valve 1, which is in fluid communication with the working connection 5 of the steering cylinder 6, is acted upon by a control signal, it is moved into the first switching position. Under this circumstance the pressure connection 2 is connected by the input pipe Z to the storage means or the pump P, the working connection 4 is connected to the working connection 5 of the cylinder 6, and the return connection 3 is blocked. Consequently, the hydraulic fluid flows from the storage means 8 or the pump P via the switching valve 1 to the working connection 5 of the cylinder 6. The hydraulic fluid flows via the working connection 5' without pressure from the steering cylinder 6 to the working connection 4' of the switching valve 1' which is in the second switching position. The flow of hydraulic fluid continues from the switching valve 1' via the return connection 3' to the tank T.

If the piston 10 of the steering cylinder 6 is to be moved in the opposite direction, the switching valve 1 is moved into the second switching position and the switching valve 1' is moved into the first switching position. Depending on the predetermined direction of movement of the piston 10, a selected one of the switching valves 1 or 1' is connected by the pressure connection 2, 2' to the storage means 8 and the other switching valve 1 or 1' is connected by the return connection 3, 3' to the tank T. In the first switching position of the switching valves 1, 1', which is under pressure, the switching valves 1, 1' comprise apertures 22. The apertures 22 are arranged between the working connections 4, 4' and the steering cylinder 6 for adaptation to the respective steering properties of the machine.

As can be seen from FIG. 2, the switching valves 1, 1' preferably have the same construction and are advantageously arranged coaxially with each other. The switching valves 1, 1' are constructed as slide seat switching valves, wherein a ball 11 or 11' is pressed on a respective valve seat 12 or 12' by means of a spring 13 or 13'. A valve tappets 14 or 14' pushes the ball 11 or 11' out of the respective valve seat 12 or 12' when operated by means of an electromagnet 15, 15', so that the switching valve 1 or 1' is now in the first switching position. A slide 16 or 16' has a unitary construction with the respective valve tappet 14 or 14'. During the just-described switching, the valve tappet 14 or 14' is moved in a manner such that the slide 16, 16' blocks flow to the output pipe A before the ball 11 or 11' is lifted out of its respective valve seat 12 or 12'. This allows a positive switching overlap, which prevents oil loss from the relatively small storage means 8 and prevents short-term pressure drop during switching.

Rapid response of the valves and hence rapid switching is achieved advantageously by the constructing the switching valves 1, 1' as ball check valves. Furthermore the storage means 8 is sealed from leaking oil (i.e. via backflow to the valves 1 and 1') by the pressure connection 2, 2' of the valves 1, 1'. Note that FIG. 1 illustrates check valves at the pressure connections 2, 2'; however, other blocking arrangements may be used. When the volume of flow is sufficient, only a relatively weak force is required to switch the valve 1, 1' because of the small diameter of the valve seat 12, 12'. The switching time is further shortened by having the electromagnet 15, 15' is preexcited; i.e., it is already supplied with an electric current so that the ball 11, 11' is not yet pushed out of the valve seat 12, 12' when the valve 1, 1' is in the second switching position. Thus, upon switching to the first switching position, only a small increase in force is necessary to push the ball 11, 11' out of the valve seat 12, 12'.

As best shown in FIG. 2, a valve unit 21 includes a blocking unit 17 having two non-return or check valves 18, 18' which open the pipes or conduits during operation of the device and reliably block the pipes or conduits to the steering cylinder 6 when the device is not operating. This blocking unit 17 is advantageous because the valve unit 21 forms part of a hydraulic working circuit which is separate from the hydraulic steering circuit provided for normal operation of the steering system in automatic steering mode. The separate hydraulic working circuit further serves to control other functions, for example for lifting cutting attachments, etc. To ensure the opening of the two pipes leading to the steering cylinder 6, while in the operating position of the valve unit 21, the non-return valve 18, 18' associated with the pressureless pipe is moved into the open position by means of a piston 19. The piston 19 is driven by pressure from the working connection 4 or 4' of the corresponding switching valve 1, 1'.

An electric pressure switch 20 senses line pressure (as in line Z) and cooperates with a 2/2-port directional control valve 23, so that the storage means or accumulator 8 can be refilled when pressure drops below a preselected minimum. After switching off the directional control valve 23, the non-return or check valve 7 maintains the storage pressure. Also, a pressure-limiting valve 24 protects the hydraulic circuit from overload pressure by dumping excess fluid to the tank T.

As can be seen from FIG. 2, the switching valves 1, 1' may be constructed as twin valves which adjoin each other directly and utilize a common input pipe Z. Because the valve unit 21 of FIG. 2 is constructed symmetrically in relation to a center axis, the same components can be used for the switching valves 1, 1'. The switching valves 1, 1' can be acted upon at the same operating level, as the same dimensions have been selected for the components. The valve unit 21 allows rapid switching of the valves, thus making it possible for small steering angles to be equalized rapidly. In particular this means reduces the risk of rear wheel oversteering. Furthermore, a higher speed or higher working capacity of the machine can be obtained, increasing the harvesting capacity.

Other objects, advantages and features of the present invention may be perceived by those skilled in the art or from the appended claims.

We claim:

1. A control device for a double-acting steering cylinder of a steering system, having two working connections, one at each opposite end of the steering cylinder; a valve unit operatively connected to the working connections; the valve unit comprising switching valve means, comprised of two switching valves, which are constructed as 3/2-port directional control valves and which can be moved alternately in each case into a first switching position and into a second switching position; a steering cylinder which is in fluid connection with the switching valves; a control signal which acts upon the switching valves to move them into either a first switching position or a second switching position; and a pressure connection which is connected by an input pipe to a storage means wherein the working connection of the switching valves is connected to the working connection of the cylinder, thereby allowing the hydraulic fluid to flow via the working connection of the cylinder to the working connection of the switching valves.

2. A control device according to claim 1, including electromagnetic means for operating the switching valves.

3. A control device for a double-acting steering cylinder of a steering system, having first and second working connections, one at each opposite end of the steering cylinder, a valve unit operatively connected to the working connections; the valve unit comprising switching valve means which can be moved alternately in each case into a first switching position and into a second switching position;

and so constructed and arranged that the steering cylinder admits a fluid at the first working connection when the switching valve means is in the first switching position and admits the fluid at the second working connection when in the second switching position; electromagnetic means for operating the switching valve means; and the electromagnetic means including means for preexcitation of the electromagnetic action on the switching valve means in the second switching position.

4. A control device according to claim 3, wherein said switching valve means are constructed as twin valves and are arranged coaxially with each other.

5. A control device according to claim 4, including a common pressurized input conduit for the twin valves, and wherein the valves have pressure connections which are directly connected to the common pressurized input conduit.

6. A control device according to claim 3, wherein the switching valve means are constructed as slide seat valves, and including a pressure connection having a ball and valve seat, wherein the pressure connection can be opened by lifting the ball out of the valve seat.

7. A control device according to claim 6, including a valve tappet for lifting the ball out of the valve seat.

8. A control device according to claim 7, wherein said valve tappet comprises a slide for closing the return connection.

9. A control device according to claim 8, wherein the slide and the valve tappet are integral, and wherein the slide is arranged on the circumferential side of the valve tappet so that, upon operation of the switching valve, the input conduit and the output conduit are blocked for a short time.

10. A control device according to claim 6, wherein said valve seat is sufficiently small such that a weak switching force applied by the electromagnet can lift the ball out of the valve seat.

11. A control device according to claim 3, wherein said switching valve means comprise two switching valves each constructed as 3/2-port directional control valves and which are integrated in the valve unit.

\* \* \* \* \*